US009139170B2

(12) United States Patent
Albertson et al.

(10) Patent No.: US 9,139,170 B2
(45) Date of Patent: Sep. 22, 2015

(54) HINGE PILLAR ASSEMBLY

(71) Applicant: GM GLOBAL TECHNOLOGY OPERATIONS LLC, Detroit, MI (US)

(72) Inventors: Todd D. Albertson, Macomb Township, MI (US); David A. Provenza, Shelby Township, MI (US); William A. Biondo, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 14/065,830

(22) Filed: Oct. 29, 2013

(65) Prior Publication Data

US 2015/0114792 A1  Apr. 30, 2015

(51) Int. Cl.
B60T 7/10 (2006.01)
(52) U.S. Cl.
CPC .......................................... B60T 7/10 (2013.01)
(58) Field of Classification Search
CPC ........ B60K 20/00; B60K 20/02; B60K 20/04; B60K 23/00; F16H 61/36
USPC ................. 74/473.1, 473.14, 473.15, 473.18, 74/473.3; 192/219.6, 220.7; 180/337
See application file for complete search history.

(56) References Cited

U.S. PATENT DOCUMENTS 3,700,080 A * 10/1972 Delorean ................... 192/219.5
4,474,085 A * 10/1984 DeVogelaere et al. .......... 477/99
4,938,092 A * 7/1990 Nebu et al. ................. 74/473.15
5,588,330 A * 12/1996 Kataumi et al. ............ 74/483 R
6,378,393 B1 * 4/2002 Bates ......................... 74/473.18
6,631,654 B2 * 10/2003 Ehrmaier et al. .......... 74/473.15
2002/0170800 A1 * 11/2002 Nagasaka et al. .......... 192/219.6
2003/0062693 A1   4/2003 Benkel et al.
2004/0016314 A1 * 1/2004 Satoh et al. ................... 74/473.3
2007/0209903 A1 * 9/2007 Hayashi et al. ............. 192/219.6
2007/0261510 A1 * 11/2007 Wang ............................. 74/523
2011/0132121 A1 * 6/2011 Park et al. ................... 74/473.12
2013/0256089 A1   10/2013 Burgardt et al.
2014/0326101 A1 * 11/2014 Han et al. ..................... 74/502.2

FOREIGN PATENT DOCUMENTS

DE         4422257 C1    11/1995
DE        10148493 A1     4/2003
DE    102012007061 A1    10/2013

* cited by examiner

Primary Examiner — James English
(74) Attorney, Agent, or Firm — Quinn Law Group, PLLC

(57) ABSTRACT

A hinge pillar assembly includes a hinge pillar including a panel. The panel including a body side outer door shut face and a defining an inner cavity and an access opening in communication with the inner cavity. The access opening is positioned in the body side outer door shut face and provides access to the manual park release actuator at least partially disposed in the inner cavity. The hinge pillar assembly further includes a cover removably coupled to the hinge pillar. The cover closes the access opening when coupled to the hinge pillar. The hinge pillar assembly further includes a manual park release actuator at least partially disposed in the inner cavity. The manual park release actuator is operatively coupled to a transmission and is configured to move relative to the hinge pillar to shift the transmission from a Park mode to an Out-of-Park mode.

20 Claims, 7 Drawing Sheets

HINGE PILLAR ASSEMBLY

TECHNICAL FIELD

The present disclosure relates to a hinge pillar assembly for accessing a manual park release actuator.

BACKGROUND

Motor vehicles typically include a vehicle body including several load-bearing structural components such as hinge pillars. For example, a hinge pillar can at least partially support a vehicle door. Other load-bearing structural components can support other parts of the vehicle.

In addition to the load-bearing structural components, motor vehicles include a power plant (e.g., engine or electric motor) that produces driving power. The driving power is transferred through a transmission to a driveline for driving a set of wheels at selected gear ratios. Automatic transmissions shift automatically to the appropriate gear ratio based on various vehicle operating conditions including speed and torque. Typically, a desired transmission operating mode is selected by the vehicle operator. The modes provided by most automatic transmissions generally include Park, Neutral, Reverse and Drive. In Drive, the automatic transmission automatically shifts between three, four, five or even six different forward gear ratios based on the vehicle operating conditions. In this disclosure, the automatic transmission is considered to be operating in an Out-of-Park mode when it is operating in any mode other than Park (e.g., Neutral, Reverse and Drive modes). It is useful to shift the automatic transmission from the Park mode to the Out-of-Park mode without the need to start the engine or supplying electrical power to the vehicle. To do so, the vehicle may include a manual park release actuator for manually shifting the automatic transmission from the Park mode to an Out-of-Park mode. As used herein, the term "manual park release actuator" refers to an actuator that can be manually manipulated in order to shift the automatic transmission from the Park mode to the Out-of-Park mode. Because the manual park release actuator can be manually manipulated, it also useful to provide access to such actuator.

SUMMARY

The present disclosure relates to a hinge pillar assembly. The hinge pillar assembly includes a hinge pillar defining an inner cavity and an access opening in communication with the inner cavity. The access opening provides access to the manual park release actuator at least partially disposed in the inner cavity. The hinge pillar assembly further includes a cover removably coupled to the hinge pillar. The cover closes the access opening when coupled to the hinge pillar. The hinge pillar assembly further includes a manual park release actuator at least partially disposed in the cavity. The manual park release actuator is operatively coupled to a transmission. The manual park release actuator is configured to move relative to the hinge pillar to shift the transmission from a Park mode to an Out-of-Park mode.

The present disclosure also relates to a vehicle body. The vehicle body includes a hinge pillar defining an inner cavity and an access opening in communication with the inner cavity. The access opening provides access to the manual park release actuator at least partially disposed in the inner cavity. The vehicle body further includes a cover removably coupled to the hinge pillar. The cover closes the access opening when coupled to the hinge pillar. The vehicle body further includes a door movably coupled to the hinge pillar. The door is configured to move relative to the hinge pillar between an open position and a closed position. The vehicle body includes a manual park release actuator at least partially disposed in the inner cavity. The manual park release actuator is operatively coupled to a transmission. The manual park release actuator is configured to move relative to the hinge pillar to shift the transmission from a Park mode to an Out-of-Park mode.

The present disclosure also relates to vehicles such as cars or trucks. In an embodiment, the vehicle includes a hinge pillar defining an inner cavity and an access opening in communication with the inner cavity. The vehicle further includes a cover removably coupled to the hinge pillar. The cover closes the access opening when coupled to the hinge pillar. The vehicle further includes a door movably coupled to the hinge pillar. The door is configured to move relative to the hinge pillar between an open position and a closed position. The vehicle further includes a transmission fixed relative to the hinge pillar. The vehicle further includes a manual park release actuator at least partially disposed in the inner cavity. The manual park release actuator is operatively coupled to the transmission.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
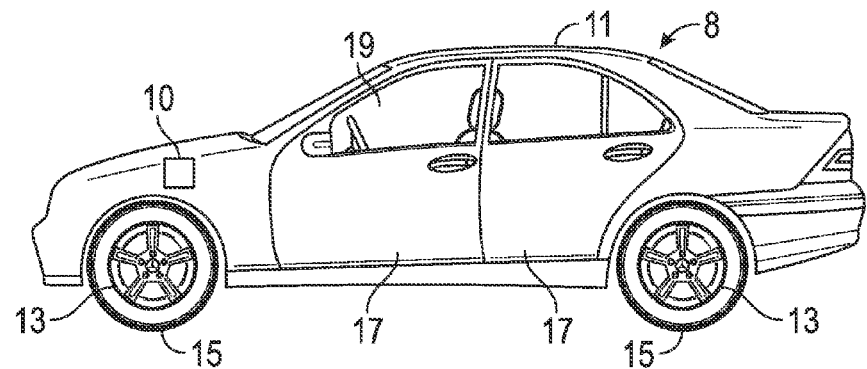
FIG. 1 is a schematic side view of a vehicle.
Figure 5:
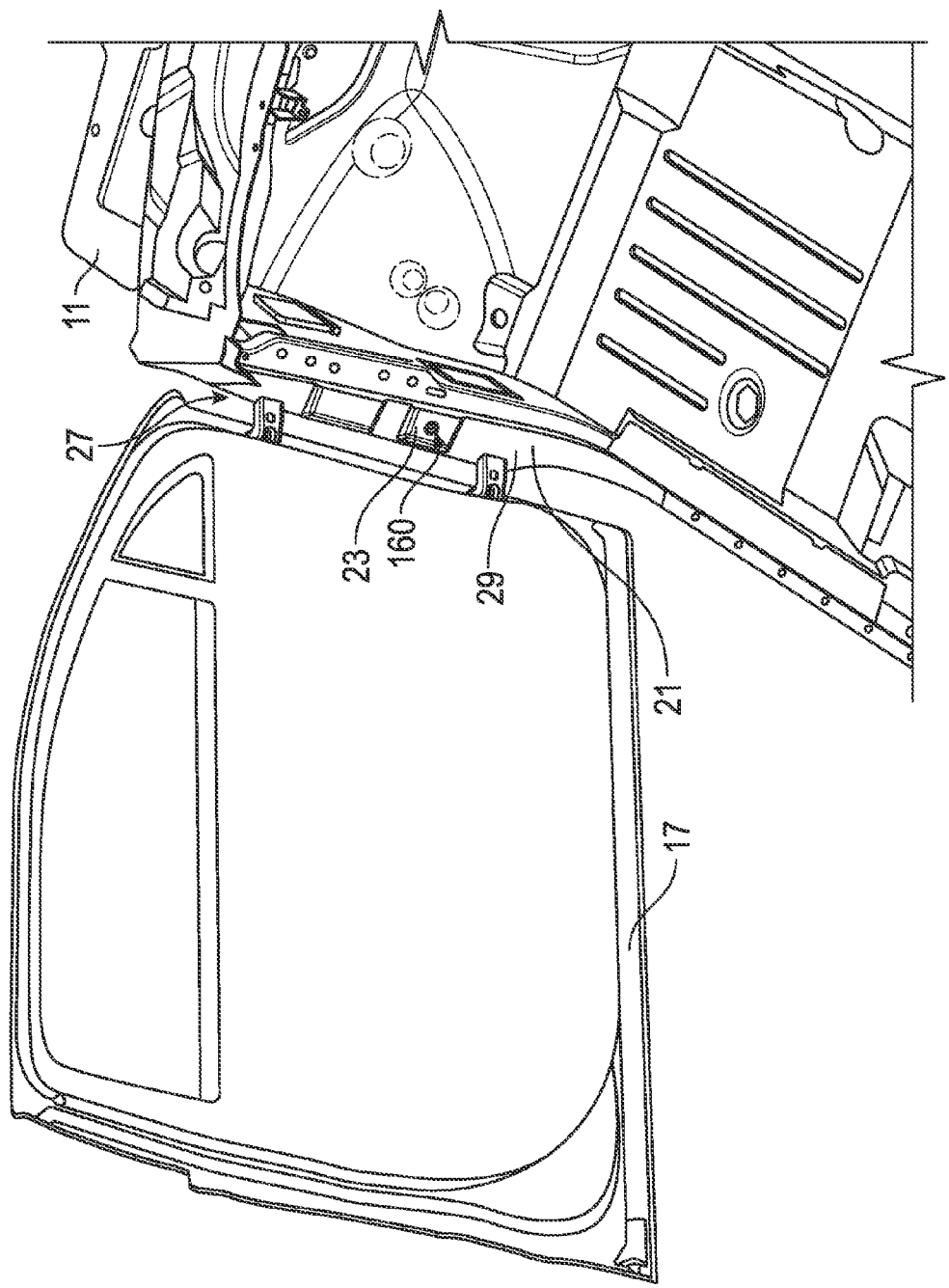
FIG. 5 is a schematic perspective view of a portion of the vehicle, showing a hinge pillar and a door in an open position.
Figure 6:
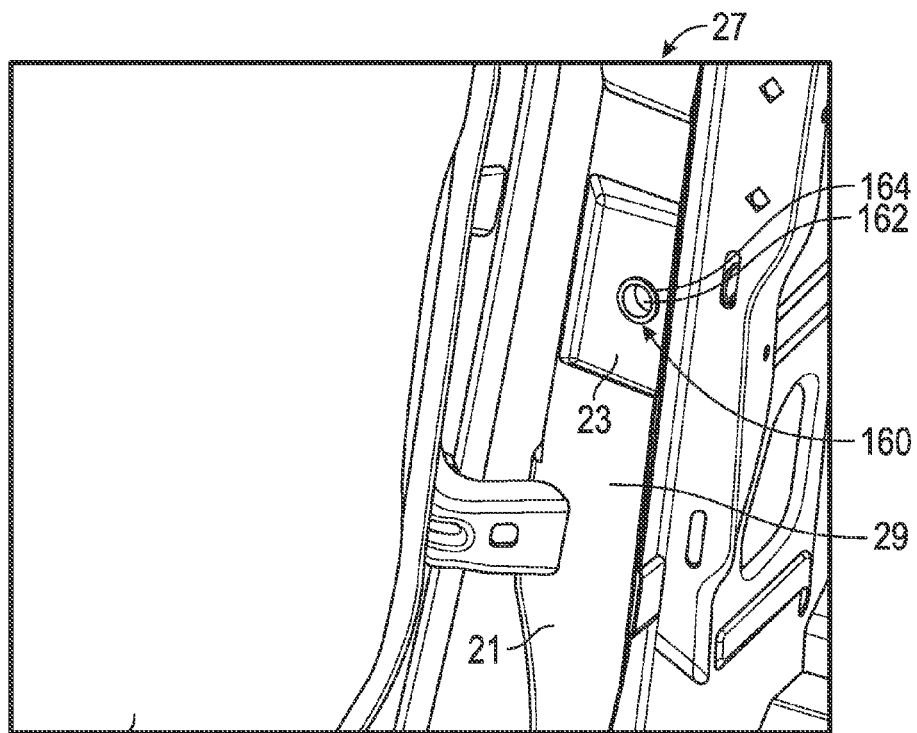
FIG. 6 is a schematic perspective view of a portion of the vehicle of FIG. 1, partially showing the door, a hinge pillar, and a cover coupled to the hinge pillar.

Referring to the figures wherein like reference numbers represent like characters, FIG. 1 schematically illustrates a vehicle 8 including a vehicle body 11 and wheels 13 operatively coupled to the vehicle body 11. Each wheel 13 is operatively coupled to a tire 15. The tires 15 are therefore operatively coupled to the vehicle body 11 through the wheels 13. The vehicle body 11 defines a passenger compartment 19 and includes doors 17 to provide access to the passenger compartment 19. Further, the vehicle body 11 includes hinge pillars 21 (FIG. 5), and each door 17 is movably coupled to a hinge pillar 21. Specifically, each door 17 can move (e.g., pivot) relative to the hinge pillar 21 between a closed position (FIG. 1) and an open position (FIG. 5). As a non-limiting example, each door 17 can be pivotally coupled to the hinge pillar 21 (FIG. 5) with hinges. Accordingly, each door 17 can pivot relative to the hinge pillar 21 (FIG. 5) between the closed an open positions. When the door 17 is in the open position, vehicle passengers can enter the passenger compartment 19. In addition to the doors 17, the vehicle 11 includes a powertrain 10 for propelling the vehicle 11.

Figure 2:
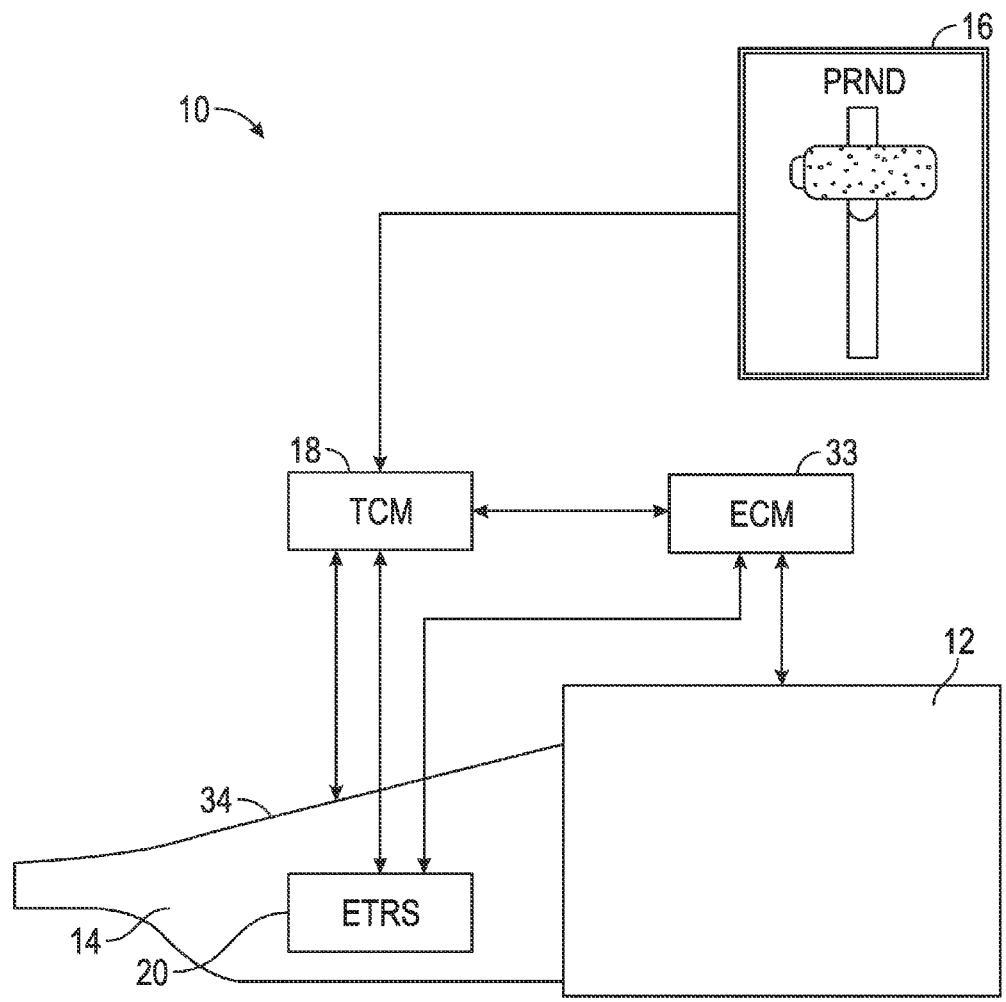
FIG. 2 is a schematic diagrammatic illustration of a partial powertrain of the vehicle shown in FIG. 1, wherein the powertrain has a transmission including an electronic transmission range selection (ETRS) system.

FIG. 2 schematically illustrates a portion of the powertrain 10. The powertrain 10 includes an engine 12, such as an internal combustion engine, and an automatic transmission 14 operatively coupled to the engine 12. The engine 12 produces driving torque that is transferred through the transmission 14 at varying gear ratios to drive at least one pair of wheels (not shown). The transmission 14 includes a housing 34 for supporting various components. A driver interface device 16 enables a vehicle operator to select various transmission range positions. The driver interface device 16 can include a lever, switches, dials, push buttons or any other type of input interface. The normal transmission range positions, including Park, Reverse, Neutral, and Drive (PRND) are selectable, as well as manual downshifts and tap-up, tap-down capabilities via actuation of the driver interface device 16. In operation, the driver interface device 16 sends a control signal to a transmission control module (TCM) 18 based on the selected operating range of the transmission 14.

The TCM 18 signals an electronic transmission range selection (ETRS) system 20 to shift the transmission 14 to the corresponding range in response to the control signal. For purposes of clarity, the ETRS system 20 is considered to be operating in a Park mode when the transmission 14 is in its Park mode of operation and to be operating in an Out-of-Park mode when the transmission 14 is in any other of the available ranges. The powertrain 10 includes an engine control module (ECM) 33 capable of receiving inputs from and send control signals to the engine 12. Additionally, the ECM 33 interfaces with the ETRS system 20 and the TCM 18 to determine the operational range of the transmission 14.

Figure 3:
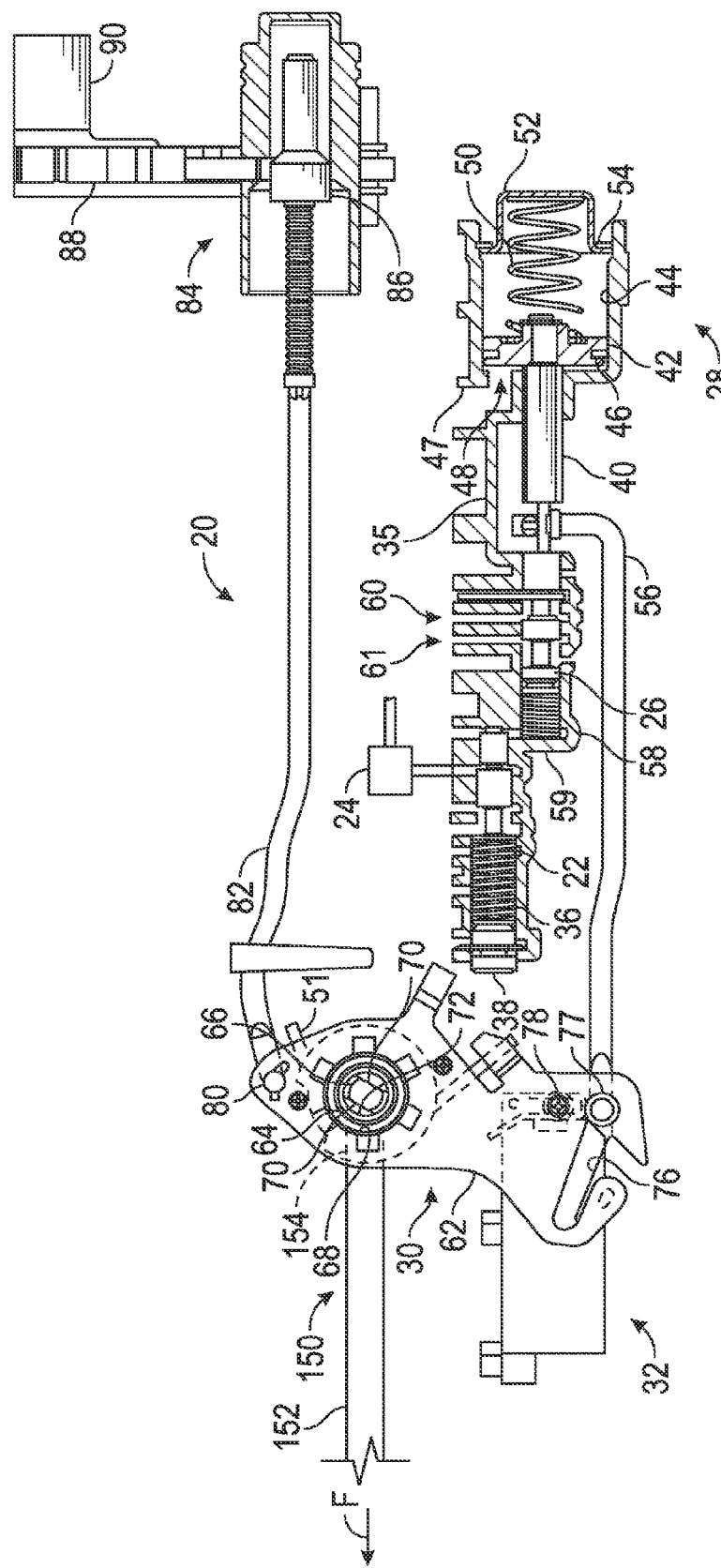
FIG. 3 a schematic, partially cross-sectional, side view of the ETRS system in a Park mode and a manual park release actuator operatively coupled to the ETRS system.
Figure 4:
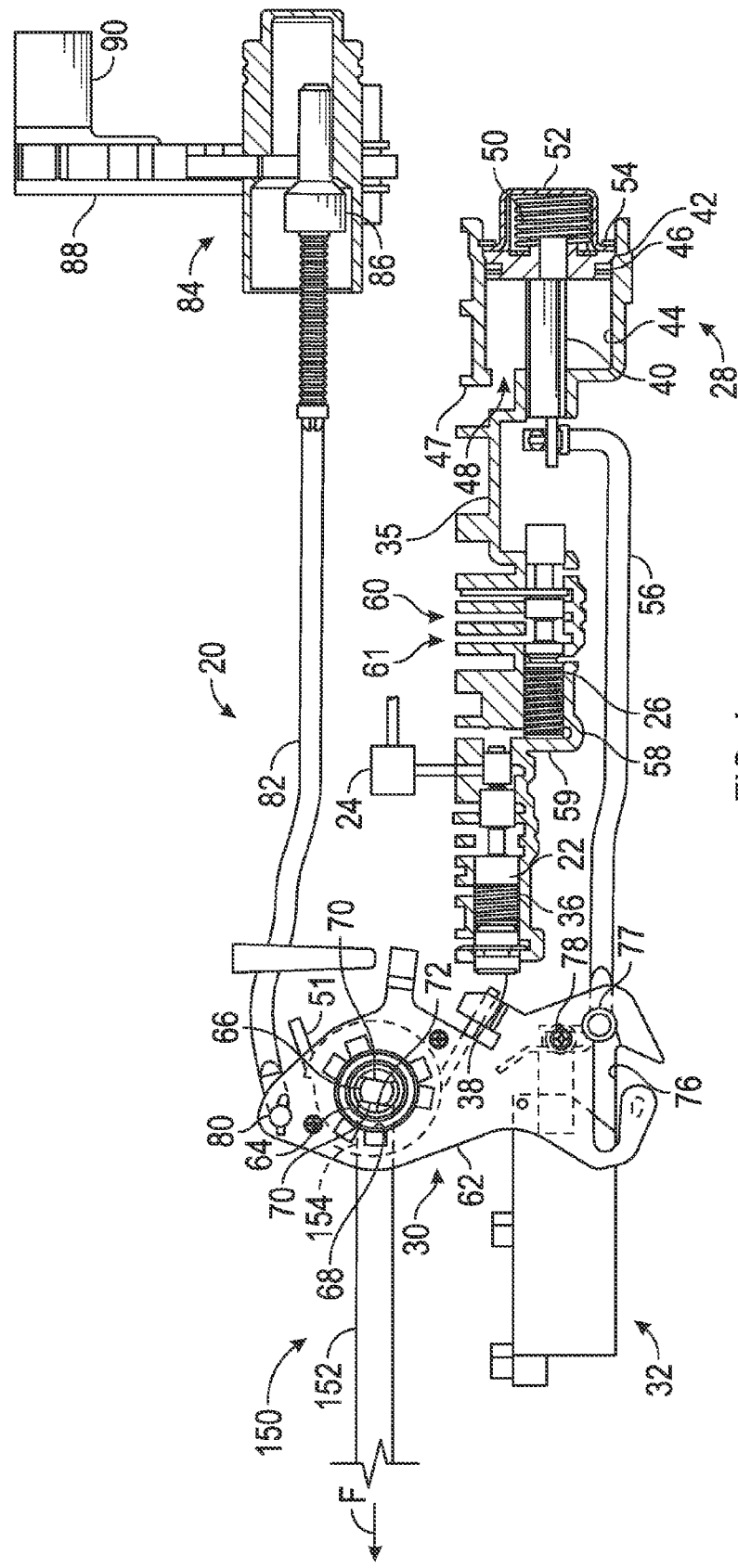
FIG. 4 is a schematic, partially cross-sectional, side view of the ETRS system, shown in FIG. 3, in an Out-of-Park mode.

Referring now to FIGS. 3 and 4, the ETRS system 20 is an integral part of the transmission 14 and operates to manipulate the flow of pressurized fluid to shift the transmission 14 between its various transmission ranges. The ETRS system 20 includes a park servo valve 22, a valve solenoid 24, a forward-reverse enable (FRE) valve 26, a hydraulic servo assembly 28, and a two-position park lever assembly 30. The ETRS system 20 also includes a park solenoid 32 that prevents shifting from the Out-of-Park mode into the Park mode in the event of a loss of pressurized fluid under specific circumstances.

The components of the ETRS system 20 are shown supported within a housing 34 (FIG. 2) of the transmission 14. The housing 34 (FIG. 2) defines a valve body housing 35 having a series of fluid flow passages. FIG. 3 illustrates the position of the various components when the ETRS system 20 is in a Park mode. In contrast, FIG. 4 illustrates the same components moved to positions corresponding to the ETRS system 20 in an Out-of-Park mode. In particular, the park servo valve 22 is slidably supported within the valve body housing 35 for movement between a first position (FIG. 3) and a second position (FIG. 4). The park servo valve 22 is biased to its first position by a spring 36. The spring 36 is disposed between a fixed spring seat 38 and the park servo valve 22. In its first position, the park servo valve 22 prohibits the flow of pressurized fluid to the hydraulic servo assembly 28. The valve solenoid 24 can be selectively actuated to control the supply of pressurized fluid required for moving the park servo valve 22 between its first and second positions.

With continued reference to FIGS. 3 and 4, the hydraulic servo assembly 28 is shown to include a servo pin 40 having a servo piston 42 fixed thereto. The servo piston 42 is slidably disposed within a cylinder or bore 44 defined by the valve body housing 35 and includes a piston seal 46 disposed about the periphery of the servo piston 42. A port 47 defined by the valve body housing 35 provides a fluid communication path to a pressure chamber 48 formed within the cylinder 44. The servo piston 42 and servo pin 40 are biased to a first position, as shown in FIG. 3, by a spring 50 and a torsion spring 51. The spring 50 sits between the servo piston 42 and a servo cap 52, which is fixed to the valve body housing 35 by a retainer ring 54. An opposite end of the servo pin 40 abuts one end of the FRE valve 26 and is fixed to a first end of an elongated servo link rod 56. The servo link rod 56 operatively connects the servo pin 40 to the park lever assembly 30. The flow of pressurized fluid through the port 47 into the pressure chamber 48 induces movement of the servo piston 42 and servo pin 40 to a second position, as shown in FIG. 4, against the biasing force exerted thereon by the spring 50 and the torsion spring 51 of the park lever assembly 30. Movement of the servo pin 40 from its first position to its second position causes the servo link rod 56 to move from a first position, as shown in FIG. 3, to a second position, as shown in FIG. 4. Furthermore, such movement of the servo pin 40 to its second position acts to release it from engagement with the FRE valve 26.

The FRE valve 26 is slidably disposed within a valve chamber formed in the housing 34 for movement between a first position, shown in FIG. 3, and a second position, shown in FIG. 4. When the servo pin 40 of the hydraulic servo assembly 28 is in its first position, the spring 50 and the torsions spring 51 of the park lever assembly 30 hold the FRE valve 26 in its first position in opposition to the biasing force exerted thereon by a spring 58. The spring 58 is seated between the FRE valve 26 and a wall portion 59 of the housing 34. In its first position, the FRE valve 26 blocks the flow of pressurized fluid to the shifting components of the transmission 14. However, upon movement of the servo pin 40 of the hydraulic servo assembly 28 to its second position, the biasing force of the spring 58 forcibly moves the FRE valve 26 to its second position. With the FRE valve 26 in its second position, the flow of pressurized fluid from port 60 is permitted to the shifting components of transmission 14 through port 61 at a desired line pressure.

The park lever assembly 30 includes a lever 62, a bushing 64 and a manual shaft 66. The manual shaft 66 is rotatably supported in one or more aligned apertures defined by the housing 34 (FIG. 2) and extends through the bushing 64. The bushing 64 is retained in an aperture 68 formed in the lever 62, whereby the lever 62 is rotatably supported by the bushing 64.

The manual shaft 66 includes a plurality of flats 70 formed along a portion thereof. The manual shaft 66 is received through a keyed aperture 72 of the bushing 64. In particular, flats 70 of the manual shaft 66 engage the bushing 64, thereby fixing the manual shaft 66 and bushing 64 for unitary rotation therewith. However, the lever 62 is free to rotate about the bushing 64. As a result, during normal operation, the manual shaft 66 does not rotate as the ETRS system 20 is moved from the Park mode to the Out-of-Park mode, thereby minimizing drag associated with a manual park release assembly 150.

The lever 62 further includes a slot 76 with a pin 77, fixed to an end of the servo link rod 56, engaging the slot 76. As such, the servo link rod 56 connects lever 62 to the servo pin 40 of the hydraulic servo assembly 28. A pin 78 extends from the lever 62 and interfaces with moveable components of the park solenoid 32. An aperture 80, defined by the lever 62, facilitates attachment of an end of an actuator rod 82 to the lever 62. The torsion spring 51 is disposed about the bushing 64 and functions to bias the lever 62 to a Park position, as shown in FIG. 3.

The actuator rod 82 is coupled to, or engages, a park pawl mechanism or assembly 84 that operates to selectively move a park pawl 86 into and out of engagement with a toothed wheel 88 that is rigidly mounted with respect to an output shaft 90 of the transmission 14. The park pawl mechanism 84 selectively locks the output shaft 90 of the transmission 14. With the park pawl 86 engaged with the toothed wheel 88, the ETRS system 20 is in the Park mode, as shown in FIG. 3. Alternately, with the park pawl 86 disengaged from the toothed wheel 88, the ETRS system 20 is in the Out-of-Park mode, as shown in FIG. 4. The movement of servo pin 40 from its first position to its second position causes the servo link rod 56 to bias the lever 62. In response, the lever 62 is induced to rotate from the Park position to the Out-of-Park position against the biasing force of the torsion spring 51. Such rotary movement of the lever 62 causes the actuator rod 82 to move from a first position to a second position thereby moving the park pawl 86 to the Out-of-Park position.

The ETRS system 20 can be manually actuated in the event of a loss of electrical power and fluid pressure within the vehicle 8. A manual park release assembly 150 is operatively connected to the park lever assembly 30. For example, the manual park release assembly 150 may be operatively connected to the manual shaft 66. A vehicle operator or maintenance personnel can manually rotate the manual shaft 66 using the manual park release assembly 150, as discussed in detail below, in order to induce rotation of the detent lever 62 from its park position to its out-of-park position. As described above, rotation of the detent lever 62 enables shifting of the transmission range to the Out-of-Park position. In this manner, the vehicle 8 is free to roll without the transmission prohibiting rolling motion.

With reference again to FIGS. 3 and 4, the vehicle 8 includes the manual park release assembly 150 for manually moving the detent lever 62 from its Park position (FIG. 3) to the Out-of-Park position (FIG. 4) in the event of a loss of electrical power and fluid pressure in the vehicle 8. As used herein, the term "manual park release assembly" refers to an assembly capable of being manually manipulated in order to shift the detent lever 62 from its Park position (FIG. 3) to the Out-of-Park position. The manual park release assembly 150 includes a manual park release actuator 152, such as a rod or cable, operatively coupled to the detent lever 62. As used herein, the term "manual park release actuator" means an actuator, such as a cable, that can be manually manipulated in order to shift the automatic transmission 14 from the Park mode to the Out-of-Park mode. As such, the manual park release actuator 152 may be simply referred to as an actuator.

In the depicted embodiment, the manual park release actuator 152 may be operatively coupled to the detent lever 62 via the manual shaft 66. In operation, a force in the direction indicated by arrow F can be applied to the manual park release actuator 152 in order to urge the detent lever 62 to move from its Park position (FIG. 3) to its Out-of-Park position (FIG. 4), thereby shifting the transmission 14 from Park mode to an Out-of-Park mode. The manual park release actuator 152 may alternatively be referred to as a cable or rod.

Figure 7:
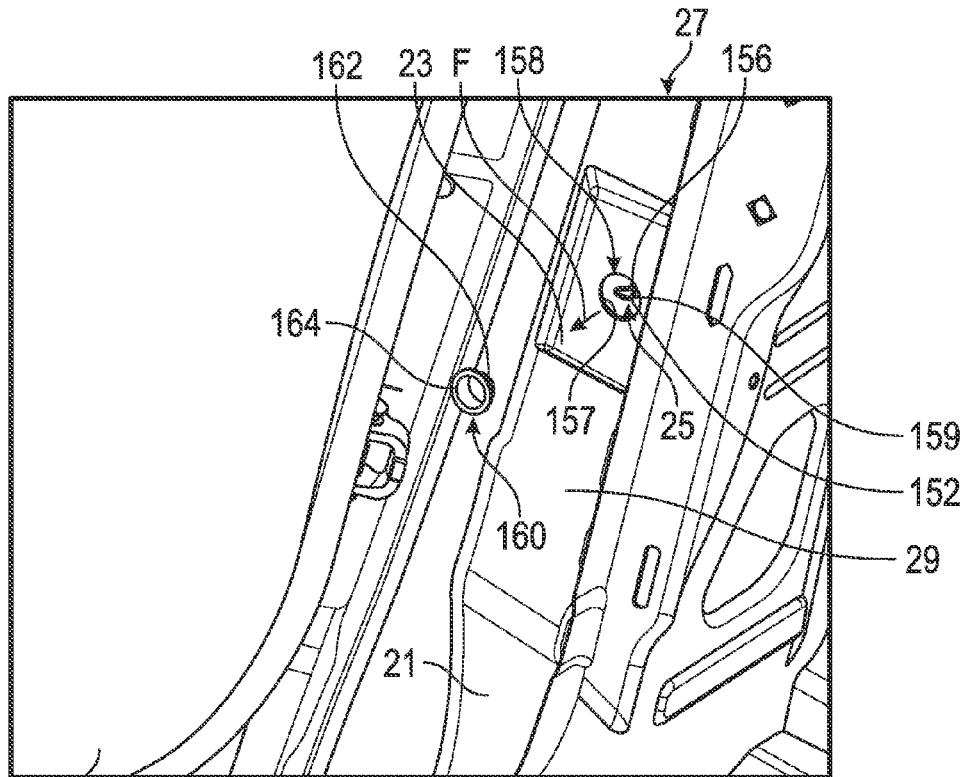
FIG. 7 is a schematic perspective, exploded view of a portion of the vehicle of FIG. 1, showing the cover decoupled from the hiller and partially exposing the manual park release actuator shown in FIG. 3.
Figure 8:
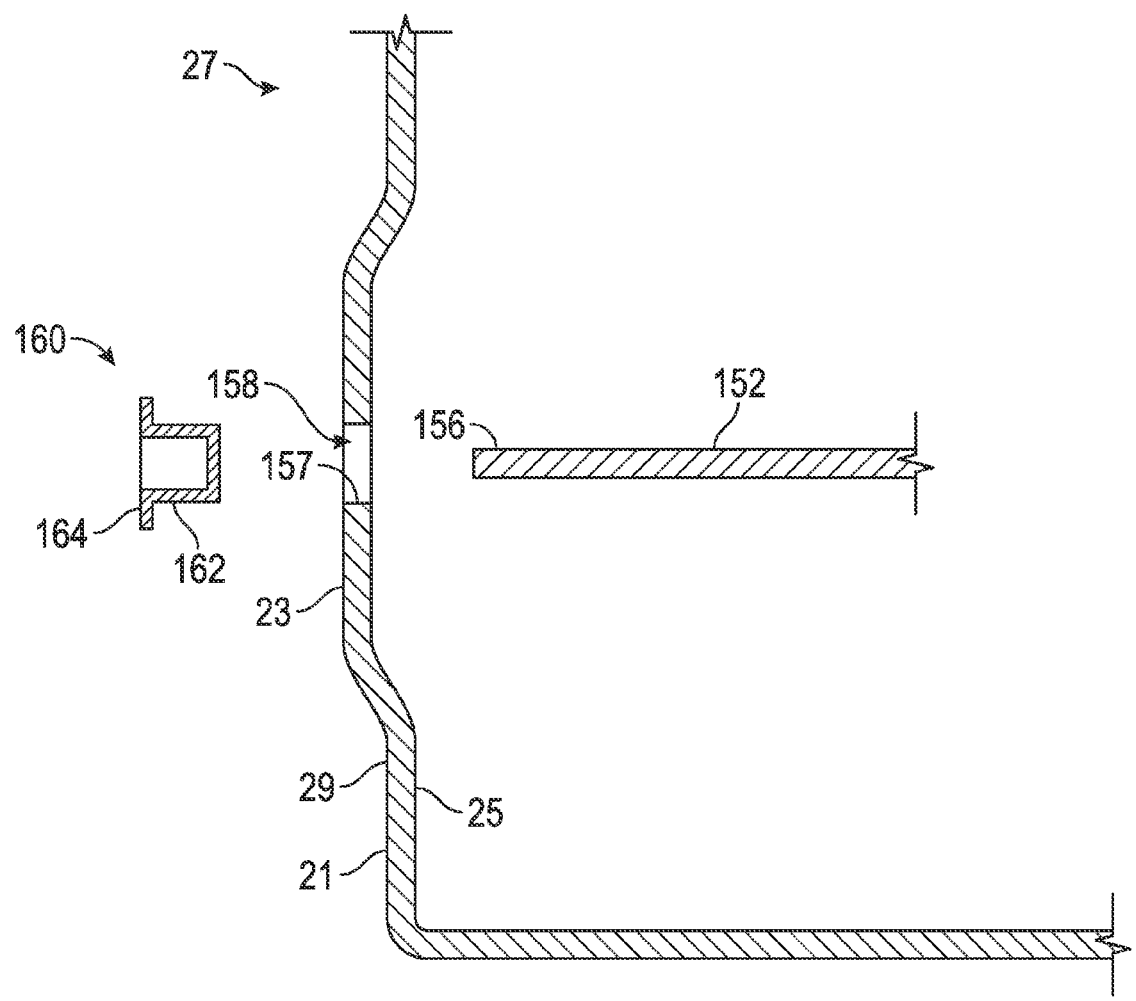
FIG. 8 is a schematic, cross-sectional view of a portion of the hinge pillar assembly, partially showing the manual park release actuator.

The manual park release actuator 152 includes a first end portion 154 and a second end portion 156 (FIG. 7). The first end portion 154 of the manual park release actuator 152 is operatively coupled to the transmission 14. Specifically, the first end portion 154 of the manual park release actuator 152 is operatively coupled to the detent lever 62. Consequently, applying a force in the direction indicated by arrow F to the manual park release actuator 152 causes the detent lever 62 to move from the Park position (FIG. 3) to the Out-of-Park position (FIG. 4). The vehicle operator or maintenance personnel can apply this force to the manual park release actuator 152 via the second end portion 156 (FIG. 7).

With reference to FIGS. 5-8, the second end portion 156 of the manual park release actuator 152 is disposed within a hinge pillar 21 of the vehicle body 11. Specifically, the manual park release actuator 152 is operatively coupled to the vehicle body 11 such that its second end portion 156 is disposed within the hinge pillar 21. Any suitable fastener can be used to couple the second end portion 156 within the hinge pillar 21. For example, brackets (not shown) can be used to couple the second end portion 156 to the vehicle body 11 within the hinge pillar 21. The door 17 is pivotally coupled to the hinge pillar 21. As a result, the door 17 can pivot relative to the hinge pillar 21 between the open position (FIG. 5) and the closed position (FIG. 1). Further, the door 17 can be locked in the closed position.

The hinge pillar 21 includes a panel 23 facing the door 17 when the door 17 is in the closed position. Specifically, the panel 21 defines a body side outer door shut face 29 that faces the door 17 when the door is in the closed position. Moreover, the hinge pillar 21 defines an access opening 158 (FIG. 7), such as an access hole, extending through the panel 23. Specifically, the panel 23 includes an inner surface 157 (FIG. 7) defining the access opening 158 (FIG. 7). The access opening 158 (FIG. 7) may have a substantially circular shape and leads to an inner cavity 25 defined by the hinge pillar 21. Thus, the access opening 158 is in communication with the inner cavity 25. The access opening 158 may extend through a raised portion of the panel 23. In particular, the access opening 158 is disposed in the body side outer door shut face 29. The second end portion 156 of the manual park release actuator 152 is at least partly disposed in the inner cavity 25 defined by the hinge pillar 21. The second end portion 156 of the manual park release actuator 152 is substantially aligned with the access opening 158 such that the second end portion 156 is exposed through the access opening 158 as shown in FIG. 7. The hinge pillar 21 may be part of a hinge pillar assembly 27.

The hinge pillar assembly 27 further includes a cover 160 for covering the access opening 158. The cover 160 can be removably coupled to the hinge pillar 21 and may be wholly or partly made of an opaque material such as an opaque polymer (e.g., non-transparent rubber). As used herein, the term "opaque" means non-transparent. As a non-limiting example, the cover 160 may be a plug and can be manually decoupled from the hinge pillar 21 to expose the second end portion 156 of the manual release actuator 152. Alternatively, a tool, such as pliers, may be used to decouple the cover 160 from the hinge pillar 21. The hinge pillar 21 and the cover 160 may be collectively referred to as the hinge pillar assembly 27.

The cover 160 can be coupled to the hinge pillar 21 via an interference fit. In other words, at least a portion of the cover 160 tightly fits in the access opening 158, and the friction generated between the inner surface 157 and the cover 160 maintains the cover 160 coupled to the hinge pillar 21. In the depicted embodiment, the cover 160 may be a plug and include cover body 162 configured, sized, and shaped to tightly fit in the access opening 158 and a rim 164 disposed around cover body 162. When disposed in the access opening 158, the friction between the cover body 162 and the inner surface 157 maintains the cover 160 coupled to the hinge pillar 21. The rim 164 is configured, sized, and shaped to rest on the panel 23 when the cover body 162 is disposed in the access opening 158. The rim 164 can prevent the cover 160 from entering the inner cavity 25 of the hinge pillar 21. The cover body 162 may be referred to as a plug body.

With specific reference to FIG. 7, the second end portion 156 of the manual park release actuator 152 may include a loop 159 to aid a user to grasp the second end portion 156 manually or using a tool such as a hook. In operation, a user first unlocks the door 17 and, then, moves the door 17 from the closed position to the open position. Next, the user decouples cover 160 from the hinge pillar 21. The cover 160 can be decoupled from the hinge pillar 12 manually or using a tool such as plies. After the cover 160 has been decoupled from the hinge pillar 21, the user can apply a force to the second end portion 156 in the direction indicated by arrow F (FIG. 4). To apply this force, the user may, for example, pull the second end portion 156 of the manual park release actuator 152. In response to this force, the manual park release actuator 152 urges the detent lever 62 (FIG. 3) to move from the Park position (FIG. 3) to the Out-of-Park position (FIG. 4), thereby shifting the automatic transmission 14 from the Park mode to the Out-of-Park mode.

Figure 9:
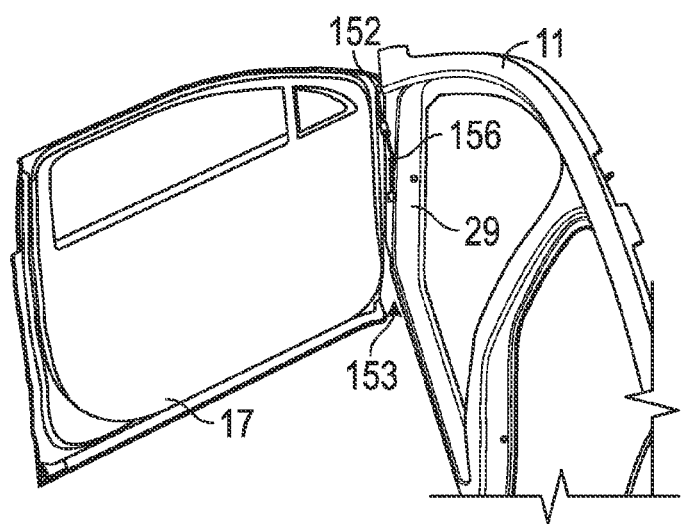
FIG. 9 is a schematic, perspective view of a portion of a vehicle including a manual park release actuator between the outer door shut face and the fender.
Figure 10:
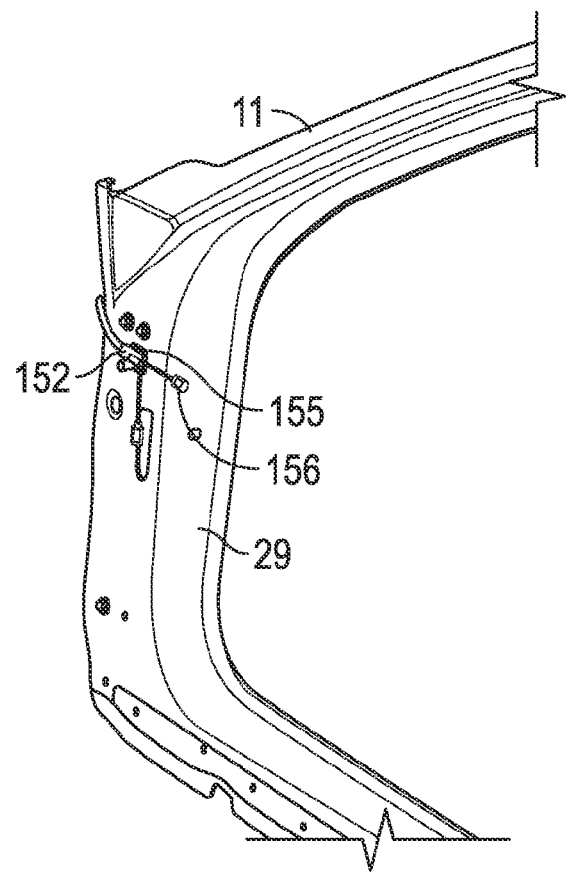
FIG. 10 is a schematic, perspective view of a portion of the vehicle body shown in FIG. 9 without the door.
Figure 11:
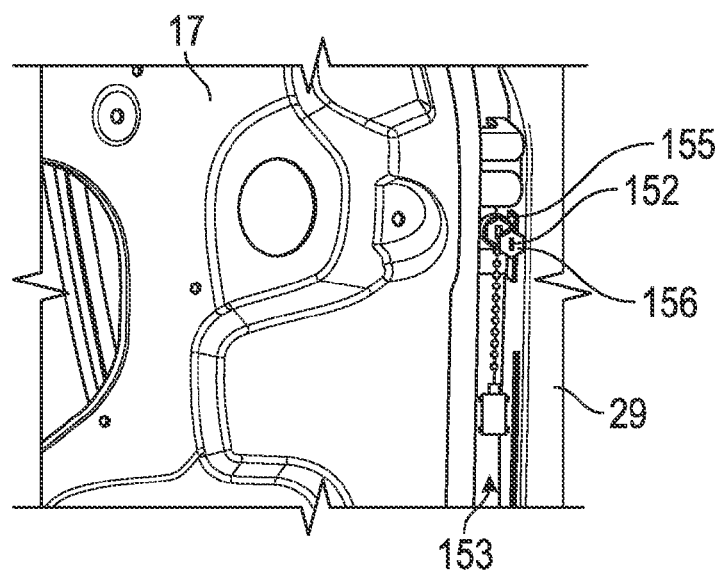
FIG. 11 is schematic, perspective, enlarged view of the vehicle shown in FIG. 9, depicting the manual park release actuator.

With reference to FIGS. 9-11, the second end portion 156 of the manual park release actuator 152 may be disposed in a cavity 153 between the body side outer door shut face 29 and the fender (not shown). The cavity 153 is disposed between the body side outer door shut face 29 and the door 17. An attachment mechanism 155, such as a bracket, may couple the second end portion 156 of the manual park release actuator 152 to the vehicle body 11 at a location between the door 17 and the body side outer door shut face 29.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A hinge pillar assembly, comprising:
  a hinge pillar includes a panel and defines an inner cavity and an access opening extending through the panel, the access opening being in communication with the inner cavity; and
  a cover which is removably coupled to the hinge pillar, wherein the cover closes the access opening when coupled to the hinge pillar;
  a manual park release actuator at least partially disposed in the inner cavity, wherein the manual park release actuator is operatively coupled to a transmission, and the access opening is disposed in the panel proximal to the manual park release actuator such that the manual park release actuator may be accessed through the access opening; and
  wherein the manual park release actuator is configured to move relative to the hinge pillar to shift the transmission from a Park mode to an Out-of-Park mode.

2. The hinge pillar assembly of claim 1, wherein the panel includes a body side outer door shut face that faces a door when the door is in a closed position, and the access opening is positioned in the body side outer door shut face.

3. The hinge pillar assembly of claim 1, wherein the cover is at least partly made of an opaque material.

4. The hinge pillar assembly of claim 1, wherein the cover includes a cover body configured to fit in the access opening.

5. The hinge pillar assembly of claim 4, wherein the cover includes a rim disposed around the cover body, the rim being configured to rest against the hinge pillar when the cover body is disposed in the access opening.

6. The hinge pillar assembly of claim 1, wherein the access opening is circular.

7. The hinge pillar assembly of claim 1, wherein the cover comprises a polymer.

8. A vehicle body, comprising:
  a hinge pillar including a panel, the panel defining a body side outer door shut face, the hinge pillar defining an inner cavity and an access opening extending through the panel, the access opening being located in the body side door shut face, the access opening being in communication with the inner cavity;
  a cover which is removably coupled to the hinge pillar, wherein the cover closes the access opening when coupled to the hinge pillar; and
  a door movably coupled to the hinge pillar, the door being configured to move relative to the hinge pillar between an open position and a closed position, and the body side outer door shut face faces the door when the door is in the closed position;
  a manual park release actuator at least partially disposed in the inner cavity, wherein the manual park release actuator is operatively coupled to a transmission, and the access opening provides access to the manual park release actuator at least partially disposed in the inner cavity; and
  wherein the manual park release actuator is configured to move relative to the hinge pillar to shift the transmission from a Park mode to an Out-of-Park mode.

9. The vehicle body of claim 8, wherein the cover includes a cover body configured to fit in the access opening.

10. The vehicle body of claim 9, wherein the cover includes a rim disposed around the cover body, the rim being configured to rest against the hinge pillar when the cover body is disposed in the access opening.

11. The vehicle body of claim 10, wherein the rim is configured to rest against the panel when the cover body is disposed in the access opening.

12. The vehicle body of claim 8, wherein the cover is at least partly made of an opaque material.

13. The vehicle body of claim 8, wherein the access opening is circular.

14. The vehicle body of claim 8, wherein the cover comprises a polymer.

15. The vehicle body of claim 8, wherein the cover is a plug.

16. A vehicle comprising:
  a vehicle body defining a body side outer door shut face;
  a door movably coupled to the vehicle body, wherein the door is configured to move relative to the vehicle body between an open position and a closed position, the body side outer door shut face facing the door when the door is in the closed position, wherein a cavity is defined between the door and the body side outer door shut face;
  a transmission fixed relative to the vehicle body; and
  a manual park release actuator at least partially disposed in the cavity, wherein the manual park release actuator is operatively coupled to the transmission.

17. The vehicle of claim 16, wherein the manual park release actuator is configured to move relative to the vehicle body to shift the transmission from a Park mode to an Out-of-Park mode.

18. The vehicle of claim 16, wherein the manual park release actuator includes a first end portion operatively coupled to the transmission and a second end portion disposed in the cavity.

19. The vehicle of claim 18, further comprising an attachment mechanism coupling the second end portion of the manual park release actuator to the vehicle body.

20. The vehicle of claim 18, wherein the manual park release actuator is a cable.

* * * * *